Dec. 31, 1963                    A. J. HIPP                    3,116,165
              METHOD OF MAKING FUEL CELL ELECTRODES AND THE LIKE
                        Original Filed Aug. 16, 1960

Inventor
Allen J. Hipp
by Richard R. Mybeck
Attorney

United States Patent Office 3,116,165
Patented Dec. 31, 1963

3,116,165
METHOD OF MAKING FUEL CELL ELECTRODES AND THE LIKE
Allen J. Hipp, 820 Robertson St., Wauwatosa, Wis.
Original application Aug. 16, 1960, Ser. No. 49,957. Divided and this application June 21, 1961, Ser. No. 118,653
10 Claims. (Cl. 117—217)

This invention relates generally to the manufacture of electrodes and like members and more particularly to the manufacture of improved electrodes for use in fuel cells.

"Fuel cells," as that term is used herein, defines those devices in which chemical energy of fuels is converted directly into electrical energy by electrochemical reaction. Such devices essentially comprise (1) means for containing a preselected chemical reaction of the type which provides a surplus of energy and (2) means for capturing the "surplus" energy formed by the reaction as electrical energy.

As generally constructed, a fuel cell comprises a housing into which at least two electrically conductive electrodes of opposite polarity are placed in juxtaposition with an electrolyte therebetween. For exemplary purposes only, the fuel cell shall be herein described as a hydrogen-oxygen type cell, although any suitable combination of fuel and oxidant may be employed within the scope of this disclosure. In the case of the hydrogen-oxygen fuel cells, a most satisfactory electrolyte is found among the hydroxides of the alkali metals such, for example, as sodium hydroxide, potassium hydroxide and the like.

At one side of each cell, when it is conditioned for operation, the fuel gas is fed into the space (called a "gas space") between one of the electrodes and the housing or an adjacent cell. The gas diffuses from the space through the electrode (herein called the "negative" electrode) and is adsorbed on the surface of the electrode adjacent the electrolyte where it reacts with thet electrolyte to free an electron.

An external path is provided by a suitable conductor to connect the negative electrode with the second electrode (herein called the "positive" electrode) at the other side of the cell. The electrons, deposited upon the negative electrode in the manner indicated, thus flow through the external path to the positive electrode. This flow of electrons provides an electric current which can be put to work.

Further, the flow of the electrons through the external path provided between the electrodes in addition to constituting the electrical output of the cell, also provides support to the oxygen half of the reaction, as will now be explained.

On the positive side of the cell, an oxidant is fed into the space (called an "oxidant space") between the electrode and the housing or an adjacent cell. The oxidant diffuses through the electrode and is adsorbed on the electrode surface adjacent the electrolyte.

Then, by a somewhat circuitous reaction, the adsorbed oxidant, the incoming electrons ($e^-$) and the water in the electrolyte react to form hydroxyl ions. The hydroxyl ions then complete the cycle by migrating through the electrolyte to the negative electrode.

While efficiency of energy transformation is of extreme importance to the advent of a practical fuel cell, there are other factors which must also be considered before a fuel cell is to enter a competitive market as a universal power source.

A major problem in the low temperature catalyst-activated fuel cell is obtaining an electrode-catalyst arrangement which enables a maximum amount of current per unit of electrode area to be obtained at a constant voltage. Hence, we face a specific problem which the present invention solves.

The present invention is predicated upon our discovery that the strategic deposition of special applications of catalytic compositions upon a plaque formed of porous nickel and the like, provides, for use in fuel cells and like apparatus, an electrode which is mechanically stable, chemically resistant to attack by fuel cell electrolyte, provides a maximum surface for deposition of catalyst, maximum accessibility to the catalytic surface for both the electrolyte and the reactant gases, which can be utilized either as an anode, a cathode or both and which, in action, delivers a high current density per unit of surface area at a constant voltage for a remarkedly unexpected length of time.

A further problem which is encountered in the application of catalyst upon electrode plaques also needs solution. It evolves from the fact that the most effective catalyst presently known for low-temperature, low-pressure fuel cells is platinum, an extremely costly reagent of only limited supply. Other catalysts in the platinum family, to wit: palladium, ruthenium, osmium, iridium and rhodium, do give acceptable results when handled in a proper manner although the electrodes carrying a platinum catalyst are still the best.

The problem then is to find a way to obtain an electrode for use in the fuel cell which provides the electrical characteristics of an electrode carrying platinum catalyst while substantially eliminating a major portion of, and thereby the cost of the platinum and/or platinum compounds heretofore required.

The present disclosure presents a relatively simple but remarkably unexpected solution to that problem based upon my discovery that the replacement of as much as 90 percent of platinum from the catalytic concentration disposed upon the electrode plaque with another catalyst such as palladium, does not, as would be expected, reduce the electrical properties of the cell to a value somewhere between that obtainable when the concentrations are respectively completely of platinum and palladium, but rather, when performed in the manner and within the limits hereinafter defined, provides results at least equal to that obtainable when the catalytic concentration is entirely formed of platinum.

Accordingly, one of the prime objects of the present invention is to provide an improved method for making an electrode for use in a fuel cell and like apparatus which obtains a high efficiency and high power output at a significantly lower cost than heretofore believed obtainable.

It is another object of the present invention to provide a method of manufacturing improved catalyst active members for use in low-temperature, low-pressure fuel cells and the like in which the strategic application from special catalytic formulations, in and on a base plaque, obtain an unexpectedly remarkable catalytic action.

An even further object of the present invention is to provide an improved method of forming electrodes and the like in which catalyst is strategically disposed upon a base plaque and obtains therewith a bond of remarkable tenactity.

A still further object of the present invention is to provide an improved method of forming electrodes and the like whereby an enhanced effective catalytic surface area is realized having its maximum catalyst concentration at the situs of maximum utility.

Still another object of the present invention is to provide an improved electrode for use in fuel cells and like apparatus and a method of producing same in which a porous plaque is treated with sequential applications of catalytic compositions to provide an intermittently, essentially monomolecular, catalytic concentration at the situs of maximum utility whereby the gas adsorptive characteristic of the electrode is substantially equal to electrodes bearing an equal amount of platinum deposited thereupon by the best method known and is greatly enhanced over the characteristic of electrodes bearing an equal amount of platinum deposited by the single application technique common to the prior art.

It is still another object of the present invention to provide an improved method of producing catalyst active electrically conductive members which are mechanically stable, nonbrittle, resistant to shock, chemically resistant to attack by caustic and possesses a relatively large catalytic surface which is readily accessible to both electrolyte and reactant gases.

Another object of the present invention is to provide a new method of applying catalyst to porous nickel plaques in which the plaque is successively immersed into a plurality of specially formulated baths having the synergist propensity of applying catalyst to random portions of the plaque surface and thereafter etching other portions thereof to produce new active centers for the acceptance of additional catalyst from subsequent baths.

These and still further objects, as shall hereinafter appear, are readily fulfilled by the present invention in a remarkably unexpected fashion as shall be discerned from the following detailed description of methods and electrodes exemplifying the present invention. Further, the complete significance and scope of the advance of the present disclosure will be further enhanced when the foregoing is considered in conjunction with the accompanying drawing in which.

Figure 1:
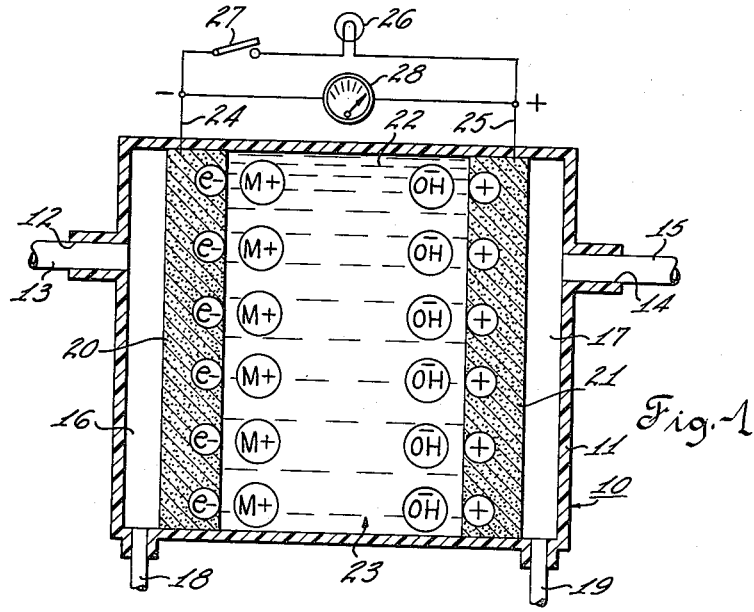
FIG. 1 is a schematic showing of a fuel cell under "no load" conditions, as a typical application for a member produced in accordance with the present invention.

Referring now to FIG. 1, a fuel cell of the type which may employ the present invention is indicated by the general reference number 10.

Fuel cell 10 comprises a housing 11 having a gas inlet means 12 defined in the left (relative to the drawing) side wall thereof connecting the fuel cell, by means of a suitable connecting tube 13, with a source (not shown) of a suitable gaseous fuel such, for example, as hydrogen or the electrochemically reactive hydrogen compounds such as the aliphatic hydrocarbons, methane, ethane, propane and the like.

Second gas inlet means 14 is similarly defined in the opposed or right (relative to the drawing) side wall thereof for connecting the fuel cell, by means of a suitable connecting tube 15, with a source (not shown) of a suitable oxidant for which oxygen, the most common, will be considered illustrative.

Gas inlet means 12 and 14, respectively, feed gas spaces 16 and 17 defined within the housing in a manner to be hereinafter more fully described. Each gas space 16 and 17, is respectively provided with outlet means 18, 19 at the bottom thereof for trapping and discharging condensate therefrom.

Disposed within housing 11 and in spaced relationship to each other are first and second electrode members 20, 21 which coact with each other and housing 11 to define therebetween a chamber 22 which, when the cell is prepared for operation, is filled with the suitable electrolyte 23. Electrodes 20, 21 further provide the inner wall for gas spaces 16, 17, respectively.

Extending out from housing 11 are a pair of electrical leads 24, 25. Lead 24 is connected to electrode 20, while lead 25 is connected to electrode 21. To form a complete circuit, lead 25 extends to and is connected through a suitable load, exemplified by lamp 26, to one terminal of a conventional "off-on" switch 27 while lead 24 is connected to another terminal of switch 27.

In order to determine the electrical characteristics of the circuit thus established, a suitable electrical meter, such as voltmeter 28, may be connected in parallel across the circuit.

In FIG. 1, which represents a "no load" condition inasmuch as switch 27 is open and the circuit through the load is broken, the ionic action within the cell is represented as near dormant.

Figure 2:
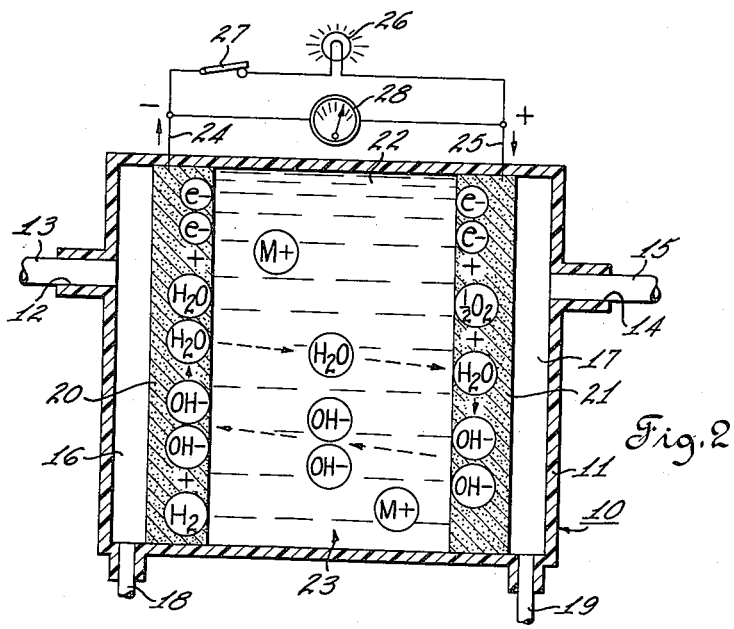
FIG. 2 is a schematic showing of the fuel cell of FIG. 1 under "full load" conditions.

In FIG. 2, the cell of FIG. 1 is shown with switch 27 closed thereby completing the circuit and establishing an external flow of electrons between electrode 20 (hereinafter referred to as "negative electrode") and electrode 21 (hereinafter referred to as the "positive electrode") through load 26.

FIG. 2 also shows schematically the relative action of the various ions and molecules during the operation of the cell. It is, of course, understood that for purposes of this description, the illustrations of the cells and the ions, electrons, etc., depicted therewith, are predominantly schematic and are shown merely to exemplify the mechanics of the cell rather than to accurately reproduce either the quantities or the actual positions of the elements at any given instant.

It is, of course, further understood that the above description merely exemplifies one type of fuel cell in which the electrode might be employed and is definitely not intended as a limitation upon its use.

Figure 3:
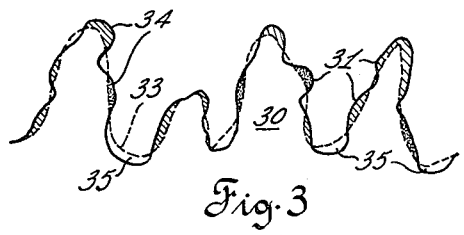
FIG. 3 is a schematic showing of a face of an electrode plaque prepared in accordance with this invention illustrating the manner in which it is believed to function.

Referring to FIG. 3, the thesis of the present invention is schematically illustrated and shows fragmentarily, a mechanically strong porous plaque 30 (preferably formed of sintered nickel) and catalyst concentration between immersions so that discrimination between the catalyst-bearing surfaces and the noncatalyst-bearing surfaces may be obtained.

It will be noted that the original surface contour 33 (shown in phantom) of the plaque 30 undergoes a change as the catalyst concentration 31 develops and the etching action (hereinafter more fully explained) creates new active centers 35.

The superficial surface of plaque 30, after the immersion, is shown in the bold line identified as 34. The platinum in the catalyst concentration 31 is shown by the dots while the palladium therein is shown with cross hatching, it being considered that two immersions have occurred, with a palladium bath and one with a platinum bath.

The subsequent immersion into a second palladium containing bath will further develop the essentially monomolecular catalytic concentration especially in the active centers 35 to complete the plaque for use.

The method by which the active catalytic concentration 31 is formed upon plaque 30 provides an important aspect of this invention, and shall now be described.

First an electrode plaque formed, in this instance, of sintered nickel, is selected. The plaque will normally have a thickness of approximately $\frac{1}{32}$ to about $\frac{3}{8}$ inch although electrodes of 0.005 inch work satisfactorily. Little electrical difference is found to exist between a $\frac{1}{32}$ inch thick and a $\frac{1}{4}$ inch thick plaque. Other factors such as cost, weight and overall size of the ultimate unit favor a thinner plaque. The faces of the plaque will generally be rectangular and have any desired dimensions. Other surface shapes can also be employed as desired.

As a matter of good practice, it is generally desirable to make sure the plaque is clean before processing it further. One suitable technique for cleaning a contaminated plaque comprises dipping the plaque into a bath containing a suitable solvent such, for example, as trichloroethylene, boiling the bath while the plaque remains therein, and thereafter rinsing each plaque to remove any residual matter therefrom. A hot water rinse is satisfactory provided the water does not introduce new contaminants onto the surface of the plaque.

After the plaque has been determined to be clean, either initially or after further cleaning, it is then treated strategically with the unique sequence of catalyst containing formulations of the present invention, one embodiment of which shall now be described.

The clean plaque is first immersed into a bath, at ambient temperature, i.e., about 20° C., and containing about one to about three percent of palladium black, as a chloride salt, in a suitable acid such, for example, as hydrochloric acid. The bath preferably is highly acidic, that is, it has a pH value of about 1.0 or less.

The plaque is maintained in the bath while the temperature of the bath is gradually increased to about 50° C. i.e., from about 40° C. to about 70° C.

The palladium from the bath forms on the plaque, adhering initially to the more pronounced protrusions therefrom, to define a randomly intermediate, essentially monomolecular layer upon portions of the plaque. While this action transpires, the bath, which was originally a brownish color, changes color to a very light yellow-green. The color change results from the displacement of palladium and the formation of nickel chloride, which is characterized by a light yellowish-green color, in the bath. This color change provides a very easy and accurate signal for the completion of the displacement reaction.

When the color of the bath changes from brown to yellow-green to indicate that essentially all of the palladium is gone from the bath, the bath is then heated to a temperature of about 50° C.–80° C. to accelerate the attack of the acid of the bath upon the exposed, i.e., non-catalyzed portions of the plaque. The action of the acid upon these exposed nickel portions is an etching action which creates new active centers on the plaque surface.

The term "active centers," as used herein, refers to those protrusions from the norm of the superficial surface of the crystals making up the electrode plaque upon which catalyst may be deployed, generally in a point having two or more sides, to provide a greater catalytic surface for exposure to the reactive gases and thereby enhance the activity of the gases as they come into contact therewith.

When the color of the bath becomes a darker green than the yellow-green originally detected, this is a signal to indicate that the desired action of the acid has occurred and that the plaque may now be withdrawn from the bath.

Next the plaque, now having one application of palladium applied thereto and being etched in the manner described, is immersed into a second bath which, at ambient temperatures, also contains about one to three percent palladium black, as a chloride salt, in a suitable acid such, for example, as hydrochloric acid. The bath is also preferably highly acidic, that is, it has a pH value of 1.0 or less.

The plaque is maintained in this bath while the temperature of the bath is gradually increased to 30° C.–50° C. It is not necessary to heat the subsequent baths as high as the initial since, for reasons not fully understood, the subsequent application of catalyst to the plaque once it has catalyst applied and is etched in the manner described, occurs more readily and at lower temperatures than does the application of catalyst to the fresh plaque in the first bath. The palladium from the bath begins to form on the plaque, being drawn by the active centers thereon previously provided by the preceding etch. In the meantime, the bath, which originally possessed a brownish color, changes to a light yellowish-green color. The color change again signals the change of the bath solution to one containing nickel chloride which, as is known, is characterized by a light yellowish-green color.

When the color change of the bath occurs, i.e., from brown to yellow-green, substantially all of the palladium chloride is gone from the bath and the bath is then heated to a temperature of 50° C.–80° C. to accelerate the etching effect of the acid of the bath upon the remaining exposed portions of the nickel plaque. The action of the acid upon the uncatalyzed or exposed nickel creates new active centers.

When the bath acquires a darker green color than the yellow-green detected at the beginning of the etching period, the plaque can be withdrawn from the bath and rinsed as before.

The plaque, now carrying two applications of catalyst, and freshly etched in the manner described, should be carrying at least approximately 10–14 milligrams of palladium per each square inch of superficial plaque area. If the plaque is carrying less than this amount, as can readily be calculated using well known stoichiometric calculations, a third bath may be employed in the same manner as the second bath, just described, to achieve this mean concentration.

After the mean concentration of palladium has been deposited upon the electrode plaque in the randomly intermittent essentially monomolecular fashion described, the plaque is now in condition for its final processing as shall now be described.

The palladium-bearing plaque is next immersed into another bath, likewise at ambient temperatures. This bath, however, contains about one to three percent platinum black, as a salt such, for example, as platinic chloride in a suitable acid such, for example, as hydrochloric acid. The bath is preferably highly acidic, that is, it has a pH of 1.0 or less.

The plaque is maintained in this bath while the temperature of the bath is gradually increased to about 30° to about 50° C. to enhance the rate of chemical deposition of platinum onto portions of the plaque intermediate the portions of palladium already there. The platinum forms on the plaque at the active centers provided thereupon by the preceding etch. As the platinum deposits upon the plaque, the bath again changes color from the characteristic golden color of platinic chloride to a yellow-green which indicates clearly and accurately that a nickel chloride salt is formed in the bath.

Upon noting this color change, the plaque may be removed from the bath, suitably rinsed, as with distilled water, dried and is ready to use.

For most electrodes employed in fuel cells today, two palladium applications from baths each containing from about five to about ten milligrams of palladium for each square inch of electrode surface area and one platinum application from a bath containing from about one to about three milligrams of platinum for each square inch of electrode surface area will produce quite satisfactory results. It is, of course, understood that the exact formulation of the several baths will vary for electrode plaques having different surface areas, the exact amount of catalyst in solution being determinable by well known stoichiometric calculations which require no elaboration here.

If it is desired to use other of the platinum family metals for the palladium in the foregoing process, although palladium is preferred, equally accurate color changes also occur. Thus, when original baths containing iridium chloride (brownish-black), osmium chloride (dark brown), rhodium chloride (reddish-brown) and ruthenium chloride (colorless) are used, the above indicated characterizing colors will change to the predominant yellowish-green of nickel chloride as the application nears completion.

The foregoing process thus illustrates, among other things, two contributions to the art of especial importance, namely: (1) decided and unexpected properties are provided in the operation of fuel cells and like electrical apparatus when the electrodes are manufactured by treating the electrode with a plurality of applications of catalyst thereto from a bath which synergistically coacts with the plaque to further etch uncatalyzed portions of the plaque, without disturbing the catalyzed portions thereof, to create new active centers for the subsequent application of catalyst; and (2) decided and unexpected properties are provided in the operation of fuel cells and like electrical apparatus when the electrodes are manufactured by treating the electrode with a plurality of catalytic applications of varied catalysts of which only about 10–20 percent need be platinum.

While the foregoing describes an embodiment of the present invention in which the application of platinum occurs last, equally fine results are obtained when platinum is applied first and when platinum is applied intermediate of the application of other catalytic materials as shown in Table III, below.

It was further determined as will appear that the ultimate catalytic concentration need only contain about 10–20 percent, such for example as 17 percent, platinum in order to give excellent results.

It was still further determined, as will appear, that only the anode requires the treatment in the amounts herein described and the cathode functions quite well with a significantly reduced catalytic concentration, that is, of about five milligrams/inch$^2$ mean concentration, which contains no platinum at all.

Data rigorously supporting the foregoing has been accumulated and is set forth in subsequent tables.

Thus, Table I presents the results of operating a fuel cell of the type shown in the drawing with a porous nickel plaque carrying sequential applications of platinum only which has been deposited in accordance with the teaching of my copending application, Fuel Cell Electrode and Method of Making Same, Serial No. 39,345, filed June 28, 1960. All of the electrodes were provided with catalytic concentrations on both faces, each measuring one inch square in area.

TABLE I

| Wt. of Catalyst Applied (gms.) | No. of Appl. | Current Density (Amps/ft.$^2$) | Voltage (Volts) |
|---|---|---|---|
| 0.038 | 2 | 14.0 | 0.7 |
| 0.057 | 3 | 18.0 | 0.7 |
| 0.076 | 4 | 29.0 | 0.7 |

Table II sets forth the results of operating a fuel cell with porous nickel plaques carrying palladium which has been sequentially applied also in accordance with the teaching of my aforementioned copending application.

TABLE II

| Wt. of Catalyst Applied (gms.) | No. of Appl. | Current Density (Amps/ft.$^2$) | Voltage (Volts) |
|---|---|---|---|
| 0.044 | 2 | 15.0 | 0.7 |
| 0.066 | 3 | 22.0 | 0.7 |

It will be noted that while electrodes prepared by sequential palladium catalyzation provides remarkably improved electrical properties in comparison to those of the prior art which were catalyzed by a single application of palladium, they still do not attain the efficiencies (amps/gms. of applied catalyst) achieved by the electrodes which are catalyzed with platinum.

The goal of the present invention, as previously stated, thus becomes even more apparent. A technique of catalyzation was needed which would provide electrodes having the efficiencies of an electrode catalyzed with platinum but which could significantly reduce, if not completely eliminate, the need to use platinum which presently costs about $81.00–$85.00 per troy ounce.

The fact that the partial replacement of palladium for platinum in the sequential catalyzation of fuel cell electrodes permits the realization of electrical properties commensurate with complete catalyzation with platinum is even more surprising when one considers the normal performance of these materials as set forth in Tables I and II above. Thus the results of the present invention are completely contrary to the normal expectation to be deduced from the previously determined characteristics of these elements (one would expect that the replacement of one or more catalytic applications of platinum by palladium would tend to provide an electrode having an efficiency somewhere between the limits of each of the materials when they are used exclusively).

As inidcated by the following examples, the contrary is true. The sequence of this invention produces electrodes whose efficiency is commensurate with, and in some instances superior to, the electrode carrying only platinum catalyst.

The following examples are presented, of course, merely to facilitate a more complete understanding of the present invention and not as limitations upon its scope.

The plaques used in these several examples are composed of fine powdered nickel which is pressed over a nickel screen and sintered in a furnace at approximately 1200° C. The plaque is approximately 80 percent porous, semiflexible, and the nickel crystals are dendritic in shape with triangular faces.

EXAMPLE 1

Square porous nickel electrodes were prepared according to this invention and incorporated into a fuel cell of the type described above. The fuel electrode received two applications of palladium to provide a randomly intermittent essentially monomolecular catalytic concentration having a mean density (in terms of the superifical area of the electrode plaque) of 0.013 gram/inch$^2$. The final catalytic application of platinum was provided by a bath formulated to provide a mean density of 0.0025 gram of platinum per square inch of superficial plaque area. An identical electrode was prepared for the oxygen side of the cell. Each electrode measured 0.060 inch in thickness.

The cell when operated on these electrodes provides a current density of 28.6 amps per square foot of superficial electrode area at a constant voltage of 0.74 volt.

EXAMPLE 2

A fuel electrode (anode) was prepared in the same manner as in Example I. The oxygen electrode (cathode) was prepared with two applications of palladium to provide a randomly intermittent essentially monomolecular catalytic concentration having a mean density of 0.004 gram/inch$^2$. Each electrode measured 0.028 inch in thickness.

The cell when operated with these electrodes provided a current density of 29 amps per square foot of superficial electrode area at a constant voltage of 0.69 volt.

EXAMPLE 3

The anode was prepared by the sequential application of 0.0035 gram per square inch palladium and 0.0015 gram per square inch platinum. The palladium was applied from two baths and the platinum from one.

The cathode was prepared by the sequential application from two baths of 0.0025 gram per square inch of palladium.

Each electrode measured 0.028 inch in thickness.

The cell operated with these electrodes developed a current density of 28.6 amps per square foot at a constant voltage of 0.70 volt.

EXAMPLE 4

An anode was prepared, using appropriate baths and the manner described, having a first application of 0.0025 gram per square inch of platinum, and a second and third application, each being approximately 0.0065 gram per square inch of palladium.

A cathode was prepared using the same method having two applications, each being approximately 0.0025 gram per square inch of palladium.

The cell operated with these electrodes developed an open circuit voltage of 0.99 volt. The closed circuit characteristics of this cell are reported in Table III below.

EXAMPLE 5

An anode was prepared, using appropriate baths and the aforedescribed technique, having a first application of 0.0065 gram/inch$^2$ of palladium, a second application of 0.0025 gram/inch$^2$ of platinum, and a third application of 0.0065 gram/inch$^2$ of palladium.

A cathode was prepared, using the same methods, having two applications, each of approximately 0.0025 gram/inch$^2$ of palladium.

The cell operated with these electrodes developed an open circuit voltage of 0.99 volt. The closed circuit characteristics of this cell are reported in Table III below.

EXAMPLE 6

An anode was prepared, using appropriate baths and the aforedescribed methods, to have a first and second application of palladium, each of about 0.0065 gram/inch$^2$, and a third application of 0.0025 gram/inch$^2$ of platinum.

The cathode was prepared the same as in Examples 4 and 5.

The cell operated with these electrodes developed an open circuit voltage of 0.98 volt. The closed circuit characteristics of this cell are reported in Table III below.

EXAMPLE 7

This sample was prepared to provide a standard against which to measure the results obtained for the previous three samples. The technique here used was the chemical deposition technique introduced by my copending application identified above.

The anode was formed having three applications of platinum, the first two being 0.005 gram/inch$^2$ and the third being 0.0055 gram/inch$^2$ to give a total catalyst concentration of 0.0155 gram/inch$^2$ as in the previous examples.

The cathode was similarly formed with two applications of platinum, each being 0.0025 gram/inch$^2$.

The cell operated with these electrodes developed an open circuit voltage of 1.00 volt. The closed circuit characteristics of this cell are also reported in Table III below.

EXAMPLE 8

A second standard was prepared using palladium. The anode was provided with three applications of catalyst being of 0.005, 0.005 and 0.0055 gram per square inch respectively. Thus, this sample also carried a catalytic concentration of 0.0155 gram per square inch as did the other samples.

The cathode carried two applications of catalyst, each being 0.0025 gram per square inch of palladium.

The cell operated with these electrodes achieved an open circuit voltage of 0.99 volt. The closed circuit characteristics of this cell are reported in Table III.

The importance of the closed circuit voltage characteristic is known. It is this characteristic which measures the effectiveness of a given cell under actual working conditions.

Data comparing the closed circuit voltage characteristics of electrodes manufactured in accordance with the present invention (Examples 4, 5 and 6) with standard electrodes (Examples 7 and 8) are reported in Table III.

TABLE III

*Closed Circuit Voltage*

| Load, Amps/Ft.$^2$ | Example No. | | | | |
|---|---|---|---|---|---|
| | 4 | 5 | 6 | 7 | 8 |
| 1.4 | 0.89 | 0.89 | 0.88 | 0.87 | 0.86 |
| 2.8 | 0.86 | 0.86 | 0.86 | 0.85 | 0.83 |
| 7.2 | 0.82 | 0.81 | 0.81 | 0.77 | 0.75 |
| 11.5 | 0.78 | 0.78 | 0.77 | 0.68 | 0.68 |
| 14.2 | 0.76 | 0.76 | 0.75 | 0.62 | 0.64 |
| 21.6 | 0.70 | 0.70 | 0.69 | 0.51 | 0.58 |
| 28.8 | 0.63 | 0.65 | 0.62 | 0.43 | 0.50 |

From Table III it becomes apparent that when the small percentage of platinum is added to palladium in a separate application, higher current densities are obtainable even over a catalytic concentration which is completely platinum (Example 7).

Thus, a new method of preparing electrodes and like members of use in fuel cells and like apparatus has been described which fulfills the aforestated objectives in a remarkably unexpected fashion and decidedly advances the progress of science in its field. It is, of course, understood that the active catalyzation of members for other applications requiring catalytic activation of hydrocarbons such as normally encountered in the petroleum industry and the like may also utilize the present teaching to great advantage.

It is, of course, further understood that the several examples and embodiments herein described and illustrated are intended to exemplify the present invention rather than limit it and it is intended that such modifications, alterations and applications as shall occur to one skilled in this art when confronted by this disclosure shall be embraced within the spirit hereof, especially as that spirit is defined by the claims appended hereto.

This application is a divisional from my copending application, Fuel Cell Electrode and Method of Making Same, Serial No. 49,957, filed August 16, 1960.

What is claimed is:

1. The method of making a catalytic active electrically conductive member comprising: immersing a porous sintered nickel plaque into a first solution containing hydrochloric acid, from about one to about three percent of the chloride salt of an element selected from the group consisting of palladium, iridium, rhodium, osmium and ruthenium, said solution having a pH of about 1.0 and a color characteristic distinguishable from green; heating said solution to a temperature of about 50° C., with said plaque immersed therein, until said element deposits intermittently upon said plaque as indicated by the color of said solution becoming yellowish-green; heating said yellowish-green solution, with said plaque immersed therein, to a temperature of about 50° C.–80° C. while said solution etches new active centers into said plaque as indicated by and until said yellowish-green solution becomes a green solution; removing said plaque from said green solution; rinsing said plaque; immersing said plaque into a second solution containing hydrochloric acid, from about one to about three percent of the chloride salt of said element selected for said first solution, said solution having a pH of about 1.0 and a color characteristic distinguishable from green; heating said solution to a temperature of about 30° C.–50° C., with said plaque immersed therein, until said element deposits intermittently upon said plaque, intermediate former deposits of said element, as indicated by the color of said solution becoming yellowish-green; heating said yellowish-green solution, with said plaque immersed therein, to a temperature of about 50° C.–80° C. while said solution etches new active centers into said plaque as indicated by and until said yellowish-green solution becomes a green solution; removing said plaque from said green solution; rinsing said plaque; immersing said plaque into a third solution containing hydrochloric acid and from about one to three percent of platinic chloride, said solution having a pH of about 1.0 and a golden color; heating said solution to a temperature of about 30° C., with said plaque element immersed therein, until said element deposits intermittently upon said plaque, intermediate former deposits of said element, as indicated by the golden color of said solution becoming yellowish-green; withdrawing said plaque from said yellowish-green solution; and rinsing said plaque.

2. The method of making a catalytic active electrically conductive member comprising: immersing a porous nickel plaque into a first highly acid solution containing from about one to about three percent of platinic chloride salt, said solution being of a golden color; heating said solution to a temperature of about 50° C. with said plaque immersed therein, until said platinum deposits intermittently upon portions of said plaque as indicated by the color of said solution becoming yellowish-green; heating said yellowish-green solution, with said plaque immersed therein, to a temperature of about 50° C.–80° C. while said solution etches new active centers into portions of said plaque other than portions upon which said element is deposited as indicated by and until said yellowish-green solution becomes a green solution; removing said plaque from said green solution; rinsing said plaque; immersing said plaque into a second highly acid solution containing from about one to about three percent of a salt of an element selected from the group consisting of palladium, iridium, rhodium, osmium and ruthenium, said second solution having a color characteristic distinguishable from green; heating said solution to a temperature of about 30° C.–50° C., with said plaque immersed therein, until said element deposits intermittently upon portions, including said newly formed active centers, from said other portions of said plaque intermediate former deposits of said element as indicated by the color of said solution becoming yellowish-green; heating said yellowish-green solution with said plaque immersed therein, to a temperature of about 50° C.–80° C. while said solution etches new active centers into said plaque as indicated by and until said yellowish-green solution becomes a green solution; removing said plaque from said green solution; rinsing said plaque; immersing said plaque into a third highly acid solution containing from about one to three percent said salt of said element selected for said second solution and being of a color distinguishable from green; heating said solution to a temperature of about 30° C.–50° C., with said plaque immersed therein, until said element deposits intermittently upon portions, including said newly formed active centers, from said other portions of said plaque and intermediate former deposits of said element, as indicated by the color of said solution becoming yellowish-green; removing said plaque from said yellowish-green solution; and rinsing said plaque.

3. The method of making a catalytically active electrically conductive member comprising: immersing a porous nickel plaque into an acid solution containing an element selected from the group consisting of palladium, iridium, rhodium, osmium and ruthenium; heating said solution to a temperature of about 30° C.–50° C.; maintaining said plaque in said solution until said element completely deposits upon portions of said plaque; thereafter elevating the temperature of said solution to about 50° C.–80° C. to promote etching of new exposed active centers into other portions of the plaque; removing said plaque from said solution; rinsing said plaque; immersing said plaque into a second acid solution containing platinum; heating said solution to a temperature of about 30° C.–50° C.; maintaining said plaque in said solution until said platinum completely deposits upon said exposed active centers of said plaque; elevating the temperature of said solution to about 50° C.–80° C. to promote etching of new exposed active centers into other portions of said plaque; removing said plaque from said solution; rinsing said plaque; immersing said plaque into a third acid solution substantially identical in composition to said first solution; heating said solution to about 30° C.–50° C.; maintaining said plaque in said third solution until said element completely deposits upon said newly exposed active centers; removing said plaque from said third solution; and rinsing said plaque.

4. The method of preparing a catalytically active electrically conductive member comprising: preparing at least two independent baths, each containing about one to three percent of an acid soluble salt of an element selected from the group consisting of palladium, iridium, rhodium, osmium and ruthenium in a highly acidic solution and a third bath containing about one to about three percent of an acid soluble salt of platinum; heating each of said baths to a temperature of about 30° C.–50° C.; immersing porous nickel into each one of said baths; prior to removing said nickel from one of said baths for immersion into the next succeeding of said baths elevating the temperature to about 50° C.–80° C.; maintaining said nickel in said bath until said bath becomes green in color; and, between immersions and after the final immersion, rinsing said nickel.

5. The method of preparing a catalytically active electrically conductive member comprising: immersing a porous nickel member into a succession of separate highly acid baths, one of said paths containing about one to three percent of an acid soluble salt of platinum, the others of said baths each containing about one to three percent of an acid soluble salt of an element selected from the group consisting of paladium, iridium, rhodium, osmium and ruthenium; heating said baths to a temperature of about 30° C.–50° C.; maintaining said member in each of said succession of said baths until said bath changes color from a nongreen to a yellowish-green; thereafter elevating the temperature to about 50° C.–80° C. to promote etching until the color of the bath becomes green whereupon said member is removed, rinsed and immersed into the next succeeding baths until all of said baths are green.

6. The method of making a catalytically active electrically conductive member comprising: immersing a porous sintered nickel plaque into a first highly acid solution containing from about one to about three percent of palladium chloride in hydrochloric acid and having a brownish color; heating said solution, with said plaque immersed therein, to a temperature of and maintaining said solution at about 50° C.–80° C. until said brownish solution becomes yellowish-green; heating said yellowish-green solution, with said plaque immersed therein, to a temperature of and maintaining said solution at about 80° C. until said yellowish-green solution becomes green; removing said plaque from said green solution; rinsing said plaque; repeating said procedure by immersing said plaque into at least one additional solution of essentially identical constitution as said first solution; heating said solution, with said plaque immersed therein, to a temperature of and maintaining said solution at about 30° C.–50° C., until said solution becomes yellowish-green; heating said yellowish-green solution, with said plaque immersed therein, to a temperature of and maintaining said solution at about 50° C.–80° C. until said solution becomes green; removing said plaque from said green solution; rinsing said plaque; immersing said plaque into a third solution containing from about one to about three percent of platinic chloride in hydrochloric acid and having a golden color; heating said solution, with said plaque immersed therein, to a temperature of and maintaining said solution at about 30° C.–50° C., until said solution becomes yellowish-green; withdrawing said plaque from said yellowish-green solution; and rinsing said plaque.

7. The method of claim 6 in which the immersion into the platinic chloride bath precedes at least one of the immersions into the palladium chloride baths.

8. The method of claim 6 in which the immersion into the platinic chloride bath precedes both immersions into the palladium chloride baths.

9. The method of claim 6 in which the platinic chloride bath contains from about 1 to about 3 milligrams of platinum for each square inch of superficial plaque area.

10. The method of claim 6 in which the palladium chloride baths each contain from about 5 to about 10 milligrams of palladium for each square inch of superficial plaque area.

References Cited in the file of this patent

UNITED STATES PATENTS

| | | |
|---|---|---|
| 1,243,111 | Sanders | Oct. 16, 1917 |
| 2,384,463 | Gunn | Sept. 11, 1945 |
| 2,690,402 | Crehan | Sept. 28, 1954 |
| 2,892,801 | Sargent | June 30, 1959 |

UNITED STATES PATENT OFFICE
CERTIFICATE OF CORRECTION

Patent No. 3,116,165                                  December 31, 1963

Allen J. Hipp

It is hereby certified that error appears in the above numbered patent requiring correction and that the said Letters Patent should read as corrected below.

In the grant, lines 1 to 3, for "Allen J. Hipp, of Wauwatosa, Wisconsin," read -- Allen J. Hipp, of Wauwatosa, Wisconsin, assignor to Allis-Chalmers Manufacturing Company, of Milwaukee, Wisconsin, --; line 12, for "Allen J. Hipp, his heirs" read -- Allis-Chalmers Manufacturing Company, its successors --; in the heading to the printed specification, line 4, for "Allen J. Hipp, 820 Robertson St., Wauwatosa, Wis." read -- Allen J. Hipp, Wauwatosa, Wis., assignor to Allis-Chalmers Manufacturing Company, Milwaukee, Wis. --; column 12, line 27, for "paths" read -- baths --.

Signed and sealed this 16th day of June 1964.

(SEAL)
Attest:

ERNEST W. SWIDER
Attesting Officer

EDWARD J. BRENNER
Commissioner of Patents